United States Patent [19]

Egosi

[11] 4,282,070
[45] Aug. 4, 1981

[54] ENERGY CONVERSION METHOD WITH WATER RECOVERY

[76] Inventor: Dan Egosi, 7 Ben Gurion Blvd., Tel Aviv, Israel

[21] Appl. No.: 910,098

[22] Filed: May 30, 1978

[51] Int. Cl.³ .......................... C02F 1/04; F22D 1/00
[52] U.S. Cl. ........................................ 203/11; 203/22; 203/26; 203/73; 203/DIG. 8; 203/DIG. 14; 202/173; 62/500; 159/24 R; 159/48 L; 122/441
[58] Field of Search .......................... 62/500; 165/105; 203/11, 24, 26, 73, 10, DIG. 20, DIG. 8, DIG. 17, 22, 98, DIG. 14; 159/24 R, 24 A, 24 B, 48 L; 202/173, 205; 126/19.5; 60/641; 122/441

[56] References Cited

U.S. PATENT DOCUMENTS

| | | | |
|---|---|---|---|
| 1,200,996 | 10/1916 | Soderlund et al. | 159/24 B |
| 1,461,640 | 7/1923 | Wirth-Frey | 203/26 |
| 2,122,012 | 6/1938 | Smith | 62/500 |
| 2,515,013 | 7/1950 | Kruhmin | 203/24 |
| 2,637,687 | 5/1953 | Buffum | 203/24 |
| 3,411,992 | 11/1968 | Mitchell | 203/26 |
| 3,423,293 | 1/1969 | Holden | 203/26 |
| 3,455,791 | 7/1969 | Nash et al. | 203/24 |
| 3,951,752 | 4/1976 | Roller | 202/173 |
| 3,962,873 | 6/1976 | Davis | 60/641 |
| 4,035,243 | 7/1977 | Katz et al. | 203/26 |

FOREIGN PATENT DOCUMENTS

| | | |
|---|---|---|
| 393061 | 4/1924 | Fed. Rep. of Germany . |
| 529464 | 7/1931 | Fed. Rep. of Germany . |
| 955718 | 1/1957 | Fed. Rep. of Germany . |
| 2530503 | 1/1977 | Fed. Rep. of Germany . |
| 342583 | 4/1960 | Switzerland . |

*Primary Examiner*—Wilbur L. Bascomb, Jr.
*Attorney, Agent, or Firm*—Kenyon & Kenyon

[57] ABSTRACT

A mechanical energy conversion method and system for the restoration of dissipated heat energy, contained in natural or artificial water bodies at or near ambient temperatures, to industrial process heat, mainly in the form of steam up to 200°–400° C. The sensible heat contained in a water body is concentrated as latent heat in low pressure water vapor which is thermo-compressed by steam ejection to an intermediate pressure level, wherefrom mechanical compression takes over, generating highly superheated output steam. The ejecting steam is not generated in a boiler, but is continuously regenerated by the compressor and routed back for repeated ejection. The compressor is driven by a heat engine whose reject heat is collected and upgraded as well. The output of heat energy is essentially equal to the sum of the heating value of the fuel consumed and the intake of latent heat and amounts thus to substantially more than the heating value of the fuel alone.

55 Claims, 6 Drawing Figures

LEGEND
—·— AQUEOUS FEED LOOP
— — LOW PRESSURE STEAM
——— HIGH PRESSURE STEAM
----- VAPOR PRE-HEATING LOOP
━━━ HEAT & COLD OUTPUT
—···— MISCELLANEOUS

ENERGY CONVERSION METHOD WITH WATER RECOVERY

BACKGROUND OF THE INVENTION

This invention relates to fuel effectiveness in energy conversion. More particularly, it pertains to a method and apparatus for the generation of heat energy and cooling capacity by mechanical means, at temperatures suitable for industrial and residential applications and at a fuel effectiveness substantially higher than the heating value of the fuel consumed.

A substantial part of world-wide fuel consumption is devoted to providing heat energy for industrial, commercial and residential purposes in the temperature range up to 400° C. Mostly, this heat is still generated in essentially the same manner since ancient times, namely by burning fuel. Even if the most elaborate methods of heat recovery are employed, the outcome of this direct approach to heat generation can never exceed the thermal equivalent of the fuel consumed, as a theoretical upper limit.

While the procedure of burning fuel directly for heat generation was sufficiently sophisticated as long as fuel was abundant and cheap, it is no longer the case. With growing awareness of this fact, alternate methods of heat energy generation have been proposed to conserve scarce fuel.

For example, U.S. Pat. No. 3,962,873 issued to J. P. Davis on June 15, 1976 discloses a process in which water is first converted to steam in the range of 65-120° C. and a corresponding pressure range of roughly 0.25-2.0 bar by means of solar collectors, and then the low pressure steam is compressed mechanically to higher pressures and temperatures suitable for industrial applications.

Though the prime-mover/compressor of the Davis system has a combined efficiency of only about 30-35 percent, additional high pressure steam can be generated from the otherwise reject heat of the engine exhaust and cooling water system to provide a total steam output, for example at approximately 4 bars and about 350° C., that may be as much as three times the amount of steam that wouuld be produced under comparable conditions by direct firing in a conventional boiler. This assumes, of course, that a substantial portion of the total heat input is supplied by solar energy.

In the example given in the patent, the solar contribution is about 65% of the total energy input. Thus, for periods when little or no solar flux is available, a fuel fired standby boiler is needed, and the fuel efficiency of the hybrid Davis process under such conditions becomes merely that of a conventional boiler.

Moreover, the Davis process follows the conventional approach to steam generation of heating an initial feed water flow, whether in a boiler or a solar collector, to convert the feed water into steam. This means that the initial feed supply must consist of relatively pure water to avoid fouling the heat transfer surfaces with deposits of impurities contained in the feed and left behind when the water boils to steam, unless the condensate is returned.

Furthermore, though the solar heating of the feed water causes an appropriately higher heat output, it is nevertheless expensive by reason of the high investment in solar collectors. A process which does not require preliminary heating of any kind for the feed water, but which can exploit the depleted heat energy inherent in the ambient feed water itself, can not only do away with the solar collectors but is also independent of available solar flux and able to operate day and night uninterruptedly in any weather without a boiler.

Throughout the world, moreover, there exist large water bodies which are too impure by nature or too polluted by men to be used directly in industrial processes or, for that matter, for human consumption, and large amounts of capital and fuel are spent to purify some of it, or at least to halt pollution. Much of this investment can be saved by a process which not only does not require feed water of boiler quality, but which even generates an output of pure water.

Examples of such ambient natural water bodies include lakes, rivers and the oceans, while man-made sources of constant supply and mostly elevated temperature include industrial effluents, municipal sewage, juices, beverages, etc.

One significant example of an above ambient temperature aqueous source is condensing water rejected from fossil fuel fired or nuclear power plants. This source at the present time is considered as a generator of thermal pollution and represents an important limiting factor in the increased use of nuclear energy.

Although the thermal energy potential in large aqueous bodies, such as the oceans, has been recognized, most proposals to extract this energy rely on significant temperature differences, such as between surface and deep ocean water, to provide a thermal potential for operating an evaporating/condensing power plant cycle using an intermediate working fluid. Any attempts to convert such aqueous sources directly into steam have been considered impractical because of the high cost of preliminary treatment to obtain boiler feed water of suitable purity.

SUMMARY OF THE INVENTION

The principal object of the present invention is to generate heat energy, mainly in the form of steam, from any available aqueous source initially at or near ambient temperature without the need for preliminary treatment of the source medium, and without requiring a conventional boiler or being dependent upon solar or other natural elevated heat sources, and with the heat content of the generated steam being substantially higher than the heating value of the fuel used for its generation.

Additional objects of the invention include the generation of cooling and even refrigeration capacity for space and process cooling concurrently with the production of high temperature steam.

Further, optional, objects of the invention are to provide a process for:

(a) the partial conversion of impure aqueous source media into pure water, as represented by the steam generated from such sources after its condensation by the user of the output steam;

(b) the concentration and cooling of aqueous solutions, dispersions, emulsions, effluents, liquors, juices, and so forth, while simultaneously extracting their water and heat content as usable steam;

(c) extraction and eventual dehydration of slurries for recovery of minerals, chemicals, organic fertilizers, and the like; and (d) absorption of waste or reject heat from the environment and from industrial processes that would otherwise thermally pollute the environment, and the simultaneous transformation of the absorbed heat into useful thermal energy.

Other objects and advantages of the invention will become apparent from the ensuing detailed description of the process and of the preferred apparatus for accomplishing it.

Broadly, the invention involves a continuous process for generating heat energy, cooling or refrigeration capacity and optionally pure water from an available aqueous feed medium, the process including:

introducing a continuous flow of an aqueous liquid feed medium at an initial temperature below the boiling point at ambient pressure into at least one enclosed region maintained at a pressure below the boiling pressure of said medium at the initial temperature;

evaporating part of the water in the aqueous feed medium as a result of the pressure maintained in the region by extracting at least a part of the heat of vaporization from the remainder of the flow of aqueous feed medium, thereby concentrating the sensible heat of the aqueous feed medium as latent heat of vaporization in the vapor and thereby cooling the remaining aqueous feed medium;

evacuating the evaporated water vapor from the region;

compressing the evacuated vapor to a predetermined output pressure, thereby enhancing the vapor's enthalpy to a level suitable for industrial processes and/or steam ejection;

delivering at least part of said compressed evacuated vapor as a first source of output heat energy and optionally as a source of pure output water from the process if an impure aqueous feed medium was used; and discharging continuously the cooled remainder of the aqueous feed medium from the region as a source of cooling capacity. The evacuating step of the invention is particularly characterized by supplying a jet of ejecting steam for evacuating water vapor evaporated from the feed medium in the region into a combined flow with said jet of ejecting steam, and the step of compressing the withdrawn vapor comprises thermo-compressing the vapor by means of the ejecting steam jet to a first pressure, intermediate between the pressure maintained in the region and the final output pressure, and then mechanically compressing the combined thermo-compressed vapor and ejecting steam from the first pressure to the output pressure.

In the usual case in which the step of compressing the vapor is accomplished at least in part by a compressor driven by a heat engine as prime mover, the process desirably includes collecting and enhancing the otherwise reject heat of the engine for additional useful output heat.

From the foregoing description of the basic process of the invention, it is immediately apparent that it departs significantly from the approach followed consistently by the prior art of generating steam, namely, the approach of adding heat to an initial feed water supply to vaporize the water. In the present process, heat is extracted from the aqueous feed medium in the evaporation step. Even though the aqueous feed medium may enter the process at or near ambient temperature, the medium itself provides the heat of vaporization required for vaporizing at least a portion of the water it contains. No boiler or other external source of direct heat transfer is required in the process to generate a high temperature steam output suitable for industrial processes.

The term, high temperature steam, as used in connection with this invention, is defined as steam having a temperature high enough to be useful for industrial processes, typically super-heated steam in the range of approximately 200°–400° C., and at pressures ranging from 0.5 bar up to the critical pressure of steam.

Aqueous sources at or near ambient temperature are normally considered to have practically no available thermal energy. In the process of the present invention, however, all of the thermal energy contained in an aqueous source above the freezing temperature (0° C. for pure water and generally lower for impure sources) becomes available to assist in converting a part of the source into steam.

In the temperate and warmer zones, for example, natural bodies of water such as ponds, lakes, and the ocean, may have ambient temperatures ranging roughly from about 10° C. to 30° C. This represents a corresponding heat content range of 10,000 to 30,000 kcal/m$^3$ of water, which is equivalent to the heating value of about 1 to 3 kilogram of fuel oil for each cubic meter of water.

In the broad aspect of the process described above, the vaporized part of the aqueous feed medium is evacuated from an enclosed region which may be an evaporation chamber, and then is compressed. An important feature of the process of the present invention is that it is adapted for use with a wide range of aqueous feed media ranging in initial temperature from at or near ambient up through tepid and warm to hot. Depending on the initial temperature level of the aqueous feed medium and the final desired temperature of the cooled remainder, the evaporation of water from the medium may take place in more than one enclosed region or stage, the regions being arranged in series at progressively lower pressure levels. The final temperature of the discharged remainder may range downward from ambient to the freezing point of the medium, which may be reduced below 0° C. by the addition of antifreeze agents, if refrigeration output capacity from the process is desired.

If the initial temperature of the available feed medium is in the warm to hot range, (about 50° C. to about 80° C.), compression of the vapor from at least the first region or stage may consist of mechanical compression only, the vapor being evacuated from the corresponding stage directly into an intake of a compressor. If evaporation is carried down only to about tepid temperature, several stages may use mechanical compression only, with the evacuated vapor from each successive stage being fed to a separate compressor or preferably to a correspondingly lower pressure intake of a multi-stage, multiple intake compressor.

In probably the majority of applications for the invention, however, the available aqueous feed medium will be at or near ambient temperature up to no warmer than tepid (i.e., in the range of about 10° C. to 40° C.). In order to avoid an excessively large compressor to handle high specific volume steam at such temperatures, the evacuation of the enclosed region or regions at tepid temperatures and below is accomplished by supplying a jet of ejecting steam for evacuating each stage and then thermocompressing the evacuated vapor by means of the jet in a converging-diverging throat to the intermediate first pressure before mechanically compressing the mixture of ejecting steam and evacuated vapor to a second pressure which is the output pressure of the system; a first stream of this output steam representing the ejecting steam, is branched off and recirculated to the steam ejectors; the remainder is delivered in a second stream as the first source of output heat energy from the process. An important feature of the invention is that the ejecting steam, represented by said first stream, is cyclically recompressed by mechanical means so that no boiler is used.

When multistage evaporation is employed for a tepid or ambient feed medium, it is advisable that all, or at least some, of the steam ejectors exhaust to the same outlet pressure, so that the thermo-compressed vapor from those stages can be collected in a common steam drum for delivery to the inlet of a mechanical compressor for pressurizing to the required output pressure of the system.

When the initial temperature of the aqueous feed medium is relativey high, it may pass through several evaporation stages before reaching an under-pressure in a chamber equal to the abovementioned intermediate first steam pressure. At this point, it becomes equivalent to an aqueous feed medium at approximately tepid temperature, and further water vapor and heat may be removed in successive evaporation stages evacuated by steam ejection.

Thus, the process of the present invention permits conversion of available aqueous sources, whether or not containing additional materials in solution, dispersion or emulsion, at initial temperatures ranging from just below temperatures suitable for direct use of the heat content down to zero degree or even below.

An important optional feature of the process of the present invention comprises delivering the cooled remainder of the aqueous feed medium discharged from the last evaporation chamber as a source of output cooling capacity from the process. A particularly preferred method for cooling comprises flowing the cooled remainder of the aqueous feed medium delivered as a source of output cooling in heat transfer relation with a substance to be cooled, for absorbing heat from said substance, and recycling the rewarmed remainder of the aqueous feed medium to the feed inlet of the first chamber.

In the event that not all of the initial heat content of the feed medium is restored during the external cooling step, the invention optionally includes flowing the remainder of the aqueous feed medium, after absorbing heat from said substance, in heat transfer relation with a thermal reservoir having a temperature equal to or higher than the temperature of the initial flow of aqueous feed medium into the first chamber, for warming the recycled feed medium up to substantially said initial temperature or higher. In cases where the source of the initial feed medium is a large aqueous body, such as a lake or the ocean, the body itself can serve as the thermal reservoir.

Depending on the compression ratio overcome during mechanical compression, the branched off first steam stream mentioned above is highly superheated, in most cases to an extent higher than necessary for efficient steam ejection. Generally, at least part of this superheat, roughly at a temperature level up to 200°–400° C., may be extracted across a heat transfer surface prior to ejection, thereby establishing a second source of heat energy output. Suitable heat extracting media include water (appropriately pressurized up to the critical pressure of water/steam to avoid unwanted phase changes), commercial heat transfer fluids, non-volatile oils, solutions of high boiling point elevation, molten salts, certain molten metals, air, etc.

In addition to the first and second output source of heat energy generated from the aqueous feed medium, steam or other usable heat output can be generated from the reject heat contained in the exhaust gases and the engine cooling water of a fuel consuming prime mover used to drive the mechanical compressor for performing the mechanical compression step. In particular, the reject heat of the exhaust gases can be converted into steam in a conventional exhaust gas boiler in a manner otherwise similar to that described in the above-mentioned Davis patent, but in counterflow, comprising a third source of output heat. The reject heat in the engine cooling water is preferably extracted by flowing the hot pressurized cooling water into a flash evaporation chamber maintained at a pressure below the pressurization level of the cooling system; evaporating part of the cooling water in the flash evaporator; compressing the generated vapor to a higher pressure and temperature suitable for industrial process applications, comprising a fourth source of output heat; delivering the cooled remainder of the engine cooling water back to the prime mover; and replenishing the evaporated quantity of cooling water.

Another optional feature of the invention comprises a double-walled evaporation chamber for use as an artificial heat sink to remove excess heat from the environment and/or from a wide variety of industrial process fluids which would otherwise create thermal pollution of the environment or which have to be cooled anyway. The double-walled evaporation chamber has a thermally insulating outer wall and a heat transferring inner wall and is used in a multistage evaporation plant only as the first chamber or chambers. Hot industrial process fluids introduced between the inner and outer wall deliver their excess heat to the chamber, thereby contributing to the evaporation rate in the first chamber or chambers and reducing mean ejecting steam consumption for the whole plant and thus fuel consumption by the prime mover.

If the reject heat of the heat engine is recovered as well, the heat energy available on the output side comprises essentially the sum of both the heat energy extracted from the aqueous source as latent heat of evaporation and the thermal equivalent of the fuel consumed in the heat engine for the restoration of said extracted heat energy to a higher specific enthalpy and for the regeneration of the ejecting steam, less a marginal amount lost through convection and radiation to the environment. In contrast to conventional conception, the heat caused by friction and turbulence during compression is not a loss to the system, though requiring an additional input of fuel, but appears superimposed on the output steam's superheat as an asset.

Since the specific latent heat of water vapor is relatively high (above 600 kcal/kg) and since the other items are actually identical to conventional fuel combustion (comprising altogether about 90% of fuel consumption), it is evident that the heat energy available on the output side exceeds substantially the heating value of the consumed fuel and may reach—depending on the working case—up to 200–240% of fuel consumption while achieving output temperatures up to 200°–400° C.

The foregoing and other features of the invention will be more clearly apparent from the detailed description of the preferred embodiments illustrated in the drawings and a subsequent discussion of the relative advantages between straight mechanical compression and combined thermo-compression/mechanical compression in terms of a compactness factor.

DETAILED DESCRIPTION OF THE PREFERRED EMBODIMENTS

Of the two systems described in detail below, the first has the widest applicability for use with available aqueous feed media at or near ambient and tepid temperature while the second is particularly adapted for use with higher temperature aqueous feeds, ranging from warm to hot.

Figure 1:
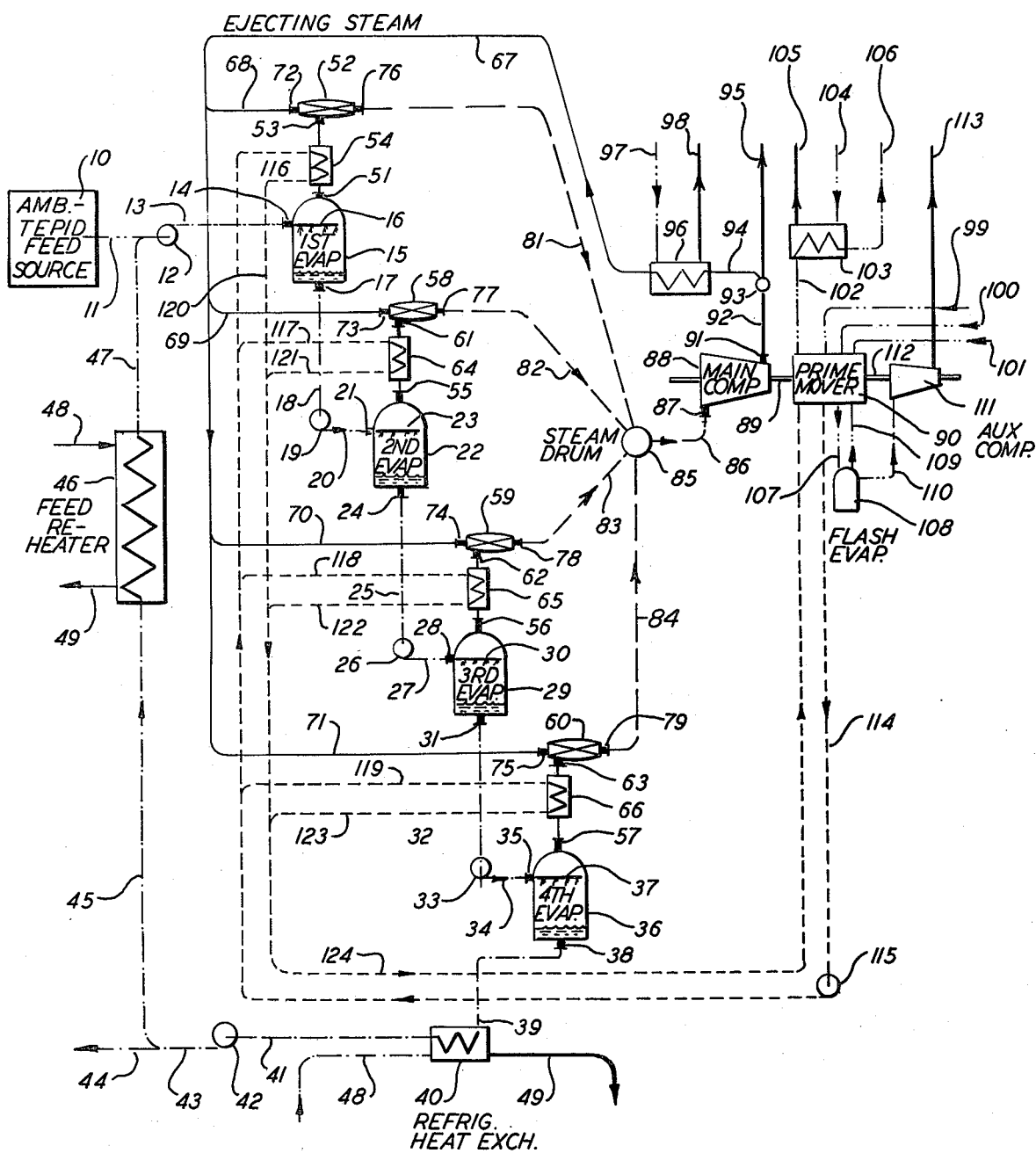
FIG. 1 is a schematic flow diagram of a four stage system according to the invention for converting dissipated heat energy contained in an aqueous feed medium at or near ambient temperature into heat energy of high enough temperature for use in industrial processes, for generating refrigeration capacity, and optionally for purifying impure water and for concentrating or dehydrating of said aqueous feed medium.

With reference to FIG. 1, a system according to the invention is illustrated for generating heat energy, cooling capacity and pure water from an aqueous feed medium having an initial temperature in the range from at or near ambient to tepid and for the concentration and dehydration of said aqueous feed medium, the schematic presentation of the system comprising: an aqueous feed loop in dash-dot lines, a low pressure steam network in long dashed lines, a high pressure steam network in thin solid lines, a preheating loop in short dashed lines, heat output and cold output conduits in heavy solid lines and diverse other conduits in dash-two-dots lines.

An aqueous feed medium from an ambient-to-tepid source 10 is delivered through supply line 11 to the input of pump 12. The outlet of the pump is connected through line 13 to feed inlet 14 of first evaporating chamber 15, which is maintained at a predetermined under-pressure. In the chamber the aqueous medium is sprayed in as a fine mist from atomizing nozzles 16. Part of the water evaporates, while absorbing the sensible heat of the surrounding spray as latent heat of evaporation, and the remainder collects at the bottom of the chamber from whence it is withdrawn through feed outlet 17 and line 18 to the inlet of second feed pump 19. From the outlet of pump 19 the aqueous medium passes through line 20 into feed inlet 21 of second evaporating chamber 22 maintained at an under-pressure lower than the under-pressure of chamber 15. As in the first chamber, the feed medium is sprayed from atomizing nozzles 23, part of it evaporating and the remainder collecting in the bottom of the chamber for withdrawal through feed outlet 24 and line 25 to third feed pump 26.

The feed medium then continues its path through line 27 and feed inlet 28 to third evaporating chamber 29 maintained at a still lower under-pressure, spraying from atomizing nozzles 30 to evaporate part and to collect the remainder in the bottom of the chamber. The remainder of the feed medium from chamber 29 leaves through feed outlet 31 and passes to a fourth feed pump 33 and thence through line 34 into a feed inlet 35 of a fourth evaporating chamber 36 maintained at the lowest under-pressure of the system. In this final chamber the feed is sprayed from atomizing nozzles 37, and as before, part of the water evaporates while the remainder of the medium collects in the bottom of the chamber from whence it is withdrawn through feed outlet 38.

From the final chamber 36 the cooled feed medium passes through line 39 into heat exchanger 40, leaving the exchanger through line 41 to enter pump 42. The medium leaves pump 42 through line 43 and may branch either into line 44, for delivery outside the process, or into line 45, to enter a second heat exchanger 46 and finally return through line 47 to join the incoming feed from source 10.

As mentioned above, evaporating chambers 15, 22, 29 and 36 are maintained at progressively lower under-pressures so as to evaporate a portion of the water vapor of the feed medium entering each chamber. Although feed pumps are illustrated in the transfer lines from one chamber to the next, such pumps will not be required if the pressure drop from chamber to chamber is great enough or if the chambers are positioned at progressively lower elevations.

One of the most important advantages of the present invention lies in its ability to use as an aqueous feed medium any suitable water-containing solution or mixture. Only the minimum amount of preliminary treatment is required before introducing the feed medium into the system. In particular, the medium should be free from solids and also from air and other gases dissolved in it. Preliminary treatment should include straining the incoming crude medium and filtering it to remove any suspended particles prior to entering the first feed pump. The next step is to deaerate the feed as thoroughly as possible, in a manner quite similar to that used in water purification systems. Deaeration reduces or eliminates the release of air and other incondensables in the subsequent low pressure evaporation stages of the process. In addition, some specific feed media, such as sewage and many industrial effluents, may require more elaborate preparation, such as preliminary removal of odor to avoid carry-over and degreasing, if necessary, to reduce clogging and prevent formation of evaporation-reducing coatings on heat transfer surfaces.

On the other hand, no treatment to prevent scale is required, since the feed medium is not heated in the system but instead is progressively cooled. Neither is any sterilization required because the high temperature of the output steam generated by the process effectively destroys all living organisms.

Evaporation chambers suitable for use in the process of the invention are similar to conventional chambers used in vacuum cooling, except there is no need to insulate the first stage chambers since they operate close to ambient temperature. Insulation is desirable, however, for the later stages of the process which are maintained at temperatures substantially below ambient, in order to minimize loss of the cooling or refrigeration capacity of the process.

In the version of the system described in FIG. 1, which incorporates preheating prior to entry of the vapor into the steam ejector, the preheater may be incorporated into an elongated bottle-neck at the outlet of the evaporator chamber. The evaporators also may include shielding plates or baffles in the vapor path to eliminate carry-over of salts or other particles contained in the feed medium. The baffle arrangement may be similar to that employed in conventional evaporators.

Each evaporation stage may consist of a single evaporator chamber, or several chambers may be arranged in parallel. As previously explained, remaining feed water from one stage may be transferred to the next stage by means of a feed pump, by use of gravity flow if the stages are arranged in descending elevation levels, or by the suction caused by the lower under-pressure in the next stage. The use of atomizing nozzles is preferred when feed pumps are employed; for gravity or suction feed it is preferred to cascade the incoming feed medium in multiple thin films in several steps over plates appropriately arranged in the way of the falling water film.

As a consequence of the evaporation of a part of the water contained therein, the remainder of the aqueous medium will leave each chamber at a lower temperature than its initial temperature upon entry, so that the feed becomes progressively cooled as it passes from chamber to chamber. It will be appreciated, of course, that the number of chambers used in any given system may be more or less than the four chambers shown in FIG. 1 for illustration, the number being determined by the initial and final feed medium temperatures and the desired temperature drop between stages. The lower limiting temperature for the remainder of the feed medium leaving chamber 36 through feed outlet 38 is the freezing temperature of the medium. Thus, the feed medium rejected from the process into heat exchanger 40 has a cooling or even a refrigerating capacity for absorbing heat from a medium desired to be cooled, which enters the heat exchanger through line 48 and leaves through line 49, passing in counterflow heat transfer relation to the refrigerating medium inside heat exchanger 40.

Having absorbed heat from the substance to be cooled in heat exchanger 40, the at least partially rewarmed feed medium may be rejected through line 44, if no further use for it can be found in the process. On the other hand, if the medium contains useful raw materials or other reusable ingredients (e.g., anti-freeze material added to lower the freezing temperature for increased refrigerating capability), the medium may be rerouted, at least in part, through an additional heat exchanger 46 to be brought up to the temperature of the entering feed from source 10.

The heating medium in heat exchanger 46 enters through line 48 and leaves through line 49, passing in counterflow to the returning feed medium inside the heat exchanger. This heating medium may be at ambient, or preferably above ambient, temperature. It may consist of industrial or municipal effluents, liquid products requiring cooling to ambient temperature, such as milk or beer after pasteurization, condenser cooling water, water heated by solar energy, or any other available heat source.

Alternatively, lines 45 and 47 can be immersed in the feed medium source 10, which may comprise the sea, a river, a pond, a sewage treatment tank, or other relatively large body of any aqueous medium, or they can pass through any non aqueous medium or industrial process capable of transferring heat to the returning feed medium, with or without the need for a separate heat exchanger.

In the event that the feed medium contains materials other than water, such as chemicals, minerals and salts in solution or dispersion, its passage through the successive evaporating stages will increase the level of concentration of these materials in the recycled feed medium. Thus, it is possible by repeated recycling, and by adjusting the amount of fresh feed medium introduced through line 11, to obtain a slurry of desired concentration from outlet line 44 for extraction of the materials in any suitable outside process.

As indicated above, the aqueous feed medium may be purposely mixed with an appropriate non-volatile commercially available anti-freeze agent to enhance the refrigeration capacity by lowering the freezing temperature of the medium. By use of such agents it is possible in practice to reach temperatures of minus 15°–17° C. Because such agents are relatively expensive, it is desirable to recycle all of the feed medium to the inlet of the first chamber so that none of the anti-freeze agent is lost. Occasionally it will be necessary to replenish or renew the anti-freeze agent. This may be done easily by withdrawing the spent medium through line 44 and introducing a new agent through source 10.

Considering next the handling of the water vapor evaporated from the feed medium, in first chamber 15 the vapor is evacuated through vapor outlet 51 at the top of the chamber. Steam ejector 52 has a vapor inlet 53 connected to the vapor outlet of the first chamber through an optional heat exchanger 54, the purpose of which will be described later. The evaporation chambers 22, 29 and 36 have similar vapor outlets 55, 56 and 57, respectively. Additional steam ejectors 58, 59 and 60 have respective vapor inlets 61, 62 and 63 connected to the additional chamber outlets through heat exchanger 64, 65 and 66.

The steam ejectors employed in the process of the invention are of conventional design which may include one or more Laval nozzles. Several ejectors may be arranged in parallel for each evaporation chamber, and successive stages may employ increasing numbers of ejectors, so that optimal vapor evacuation is achieved in relation to ejecting steam consumption, and so that the outlet pressures from each stage will be at the predetermined first steam pressure level. The system may appropriately include feedback control devices for regulating the steam supply to individual ejectors or groups of ejectors to optimize operation in varying feed conditions.

It is also possible to use conventional two-stage ejectors wherein the second stage evacuates the exit of the first stage, such that the pressure of the combined evacuated vapor/ejecting steam mix is thermo-compressed to an intermediate level at the output of the first stage and to the final level at the output of the second stage. Such two-stage ejectors are particularly advantageous for use in connection with the final evaporation stages of the system where the temperatures approach 0° C., or even below in those cases where dilute saline solutions, brines, caustic solutions or commercial anti-freeze materials are employed as or in the aqueous feed media.

The functions of steam ejectors 52, 58, 59 and 60 are to maintain the predetermined under-pressure in each of the evaporation chambers and to thermo-compress the vapor evacuated from the respective chambers to a predetermined first pressure, which is lower than the minimum pressure suitable for industrial applications and is generally in the range of 0.05–0.15 bar. To accomplish these functions, the steam ejectors are supplied from a common steam supply line 67 through respective branches 68, 69, 70 and 71 to steam inlets 72, 73, 74 and 75 of the respective steam ejectors.

Within each ejector, the vapor evacuated from the corresponding chamber is entrained in a high velocity jet of ejecting steam and is subsequently thermo-compressed in a converging-diverging diffuser system to the previously mentioned predetermined first pressure at the outlets 76, 77, 78 and 79 of the respective ejectors. From the ejector outlets, the combined flows of ejecting steam and evacuated vapor pass through lines 81, 82, 83 and 84 to a common first-pressure steam drum 85. The collected steam is then drawn through line 86 into the inlet 87 of a mechanical compressor 88 driven through shaft 89 by a prime mover 90. The mechanically compressed steam leaves the compressor through outlet 91 and line 92 to division valve 93, where a flow of steam corresponding to the ejecting steam requirements of the system is branched off through line 94, while the remainder of the steam continues through line 95 to serve as a first source of output heat for use in any suitable industrial process.

Compressor 88, like all other components of the equipment in the system, is desirably insulated to prevent loss of heat to the environment, so that compression is carried out substantially adiabatically. As a result, the steam leaving the compressor will be superheated. This is advantageous in most cases for output process steam, but it may be more economic to keep the superheat level of the ejecting steam at a lower level. Consequently, the steam branched off through line 94 may pass through heat exchanger 96 for removal of some or all of its superheat by any suitable heat exchange medium entering through line 97 and leaving through line 98, comprising a second source of output heat. The branched off steam returns an ejecting steam through supply header 67. In addition, if the optimum pressure of the ejecting steam happens to be lower than the pressure required for the output process steam, the ejecting steam may be branched off prior to the final compressor stage, or the output steam may be compressed further in an additional compressor (not shown) driven by the same or a different prime mover. Alternatively, if the pressure requirement for the ejecting steam happens to be higher than for the output process steam, the ejecting steam may be compressed further after branching off the output steam.

Although any kind of prime mover may be used to practice the broad aspect of the invention, it is contemplated that a heat engine will be the choice in most cases. A stationary diesel engine represents one suitable prime mover as an example. Its overall thermal efficiency is approximately 40%, and its cooling system and exhaust gases each provide additional heat outputs of roughly 25% of the total fuel input at relatively high temperatures. By recovering these heat outputs, the overall thermal efficiency of a diesel engine used in the process of the invention may come close to 90% after marginal losses.

The Stirling engine represents another suitable type of prime mover since both its exhaust gases and working fluid provide a heat source in the range of 250°–300° C. The Stirling engine includes an added advantage over the diesel engine in that it can use a wider variety of fuels, because it is an external combustion engine.

Prime mover 90 used to drive the mechanical compressor 88 is thus typically a combustion engine energized by fuel consumption. The engine receives fuel through line 99, combustion air through line 100 and cooling water through line 101. Hot exhaust gases resulting from combustion of the fuel and the air inside the engine exit through line 102 to an exhaust boiler 103 where they deliver a substantial portion of their heat content to a supply of feed water entering through line 104 and leaving as steam through line 105. The cooled exhaust gases leave the boiler through line 106. The exhaust boiler may be any conventional boiler, preferably operating in counterflow, and a commercially available heat transfer fluid may be substituted for water if desired. In either event, the heated medium leaving through line 105 provides a third source of output heat or steam from the system.

Heated pressurized engine cooling water leaves the engine through line 107 and enters a flash evaporation chamber 108, where part of it is flashed into steam. The cooled remainder of the engine cooling water is returned to the engine through line 109, while the vaporized part is delivered through line 110 to an auxiliary compressor 111 driven by prime mover 90 through shaft 112. The vapor pressurized in compressor 111 leaves through line 113 in the form of steam having a pressure and temperature high enough to be usable in an industrial process as a fourth source of output heat or steam from the system. The evaporated quantity of cooling water is replenished through cooling water inlet 101. The pressure of the steam from the auxiliary compressor may be the same as that from the main compressor; in which case the two output lines 95 and 113 may be joined to form a single output source, if desired.

It was previously mentioned that the vapor evacuated from chambers 15, 22, 29 and 36 preferably is preheated in respective heat exchangers 54, 64, 65 and 66. The heating medium for this purpose is supplied in the embodiment of FIG. 1 either by heated engine cooling water or hot lubricating oil to be cooled from the prime mover through line 114, pump 115 and branch lines 116, 117, 118 and 119 to the respective heat exchangers. The cooled heating medium is then returned through branch lines 120, 121, 122 and 123 to return line 124 and thence to the engine.

The heat infused into the cold vapor evaporated from the feed medium in the evaporation chambers prior to entering the ejector accelerates the forward motion of the vapor into the respective steam ejector inlets, so that less kinetic energy of the ejecting steam jet is devoted to evacuating the vapor from the chambers, and more is available for thermo-compressing the vapor. The higher outlet pressure from the ejectors obtained thereby means a higher intake pressure for the compressor 88, so that a lower compression ratio is required to reach the desired output pressure than if the vapor were not preheated. Because the preheating takes place in the low pressure range at and below the under-pressure maintained in the first evaporation chamber, even a relatively small increase in the exhaust pressure from the ejectors results in a substantial reduction in the ensuing mechanical compression ratio.

Because there is no steam available for ejection when the system of the invention is first started up, the plant of FIG. 1 initially operates on air introduced into the compressor from the outside. As the compressed air recycles through the ejecting loop its temperature and pressure progressively increase. At the same time the chambers connected to the steam ejectors become progressively evacuated until evaporation of the feed medium introduced therein commences. As more and more steam is evacuated from the chambers, it replaces the air in the system, which can be eliminated by conventional deaerating equipment, until finally the system is operating at steady state with only steam in the ejecting loop, and all air has been eliminated.

In the embodiment of FIG. 1, all of the water vapor extracted from the aqueous fluid medium is evaporated at progressively falling under-pressures in the successive chambers and then is thermo-compressed in the steam ejectors to a predetermined first steam pressure. The optimum value of this first steam pressure depends on the relation between ejecting steam consumption and the compression ratio of the mechanical compressor, as well as on the specific volume of the vapor at said first steam pressure, as will be explained in detail below. This optimum value, depending on the ejecting steam's enthalpy, is in the range of approximately 0.05–0.15 bar, corresponding to a saturated steam temperature range of about 32°–54° C.

In some cases the aqueous feed medium available for use in the system may have an initial temperature equal to or above the saturation temperature of the thermo-compressed steam leaving the ejectors at the first pressure. For example, discharged condenser cooling water or nuclear plant secondary coolant may have temperatures in excess of 32°–54° C. In such a situation, steam ejection is not needed to evaporate water from the feed medium until the temperature of the feed medium falls below the saturation temperature corresponding to the first steam pressure.

Figure 2:
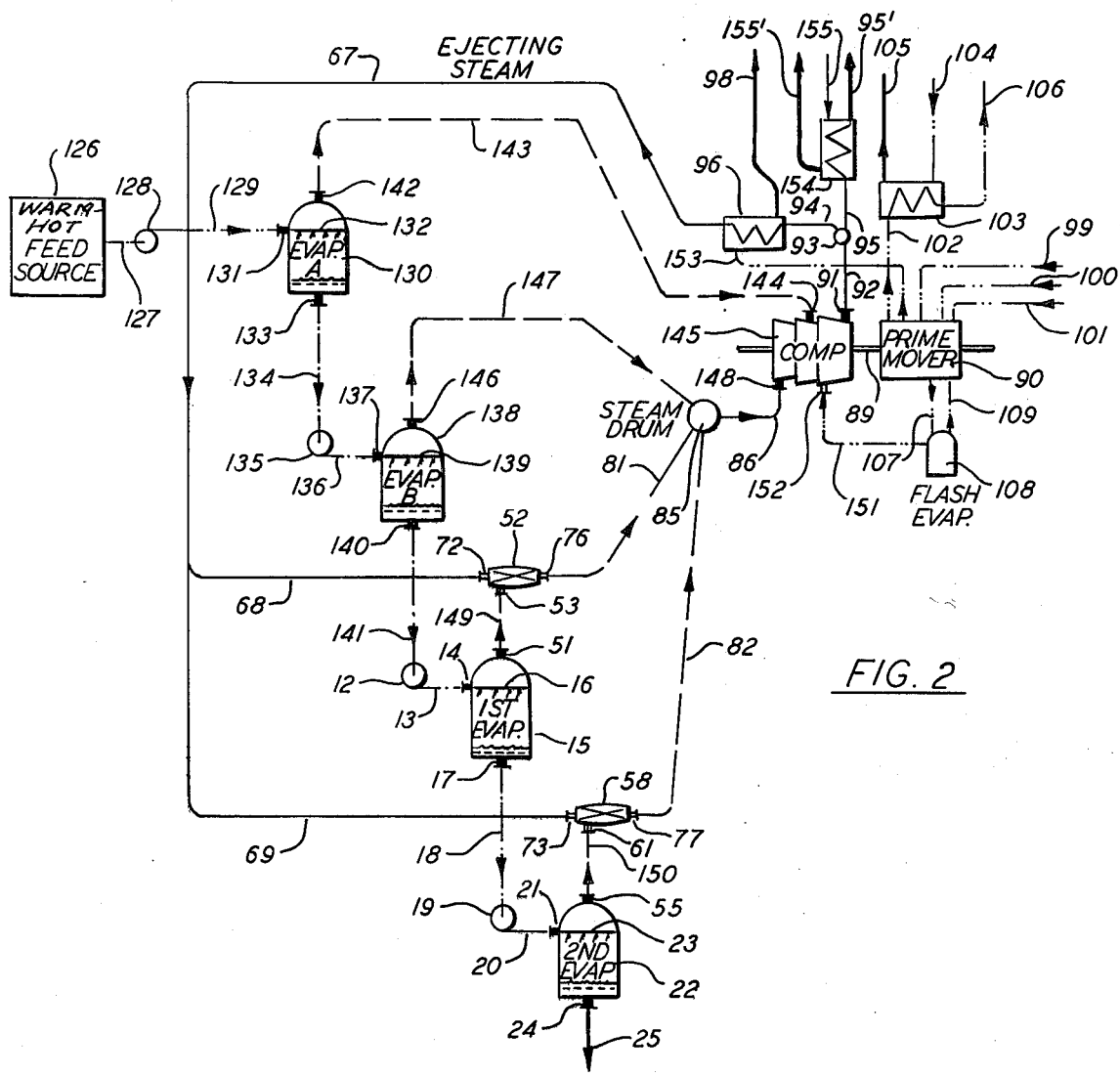
FIG. 2 is a schematic flow diagram of an alternate embodiment of the invention suitable for converting the low-grade heat energy contained in an aqueous feed medium having an initial temperature higher than the initial temperature of the feed medium in FIG. 1 into high grade heat energy, for generating cooling capacity, for purifying impure water, and for concentrating said aqueous feed medium.

FIG. 2 shows an alternate embodiment of the invention that is suitable for generating heat energy from an aqueous feed source having an initial temperature above the saturation temperature corresponding to the first steam pressure upon entering the mechanical compressor. For convenient reference, elements that are the same as elements in the embodiment of FIG. 1 are identified by the same numbers. In this way it is easily seen that the final two evaporator stages 15 and 22 in FIG. 2 correspond functionally to the first two stages of FIG. 1.

In FIG. 2 a warm aqueous feed medium (i.e., above the saturation temperature of the steam in drum 85) is delivered from a warm-to-hot source 126 through supply line 127 to feed pump 128. The feed medium leaves pump 128 through line 129 and enters an evaporation chamber 130 through feed inlet 131. Inside chamber 130 the feed medium is sprayed from atomizing nozzles 132.

Chamber 130 is maintained by compressor 145 at a predetermined under-pressure above the under-pressure in chamber 15 but below the saturation pressure at the temperature of the incoming warm to hot feed medium. Consequently, part of the water in the feed medium evaporates, and the cooled remainder collects in the bottom of the chamber, from whence it is withdrawn through feed outlet 133, line 135, pump 135 and line 136 to enter through feed inlet 137 into another evaporation chamber 138, where it sprays from atomizing nozzles 139.

Chamber 138 is maintained at an under-pressure approximately equal to the steam pressure in drum 85. Since this is below the saturation pressure of the incoming feed medium, additional water is evaporated in chamber 138, thereby further cooling the remaining aqueous feed medium, which collects at the bottom of the chamber. Unless it is decided not to continue the process into the lower pressure range, this further cooled feed medium then becomes the equivalent of ambient-to-tepid source 10 of aqueous feed medium in FIG. 1. It is withdrawn from the bottom of chamber 138 through feed outlet 140 and line 141 to enter the inlet of feed pump 12. From pump 12 the aqueous feed medium follows a path identical to that followed in the evaporation chambers of FIG. 1, if so desired, and is eventually delivered to outside the system as a source of cooling.

The water vapor evaporated from the feed medium inside chamber 130 is evacuated through vapor outlet 142 directly into steam line 143, which carries the vapor to an intermediate inlet 144 of mechanical compressor 145, inlet 144 being placed at a stage of the compressor where the pressure attained during compression is approximately equal to the under-pressure in chamber 130.

In a similar way, the water evaporated in second-stage chamber 138 is evacuated through vapor outlet 146 and steam line 147 directly into common steam drum 85. The vapor from chamber 138 mixes in the drum with the thermo-compressed vapor from steam ejectors 52 and 58, and the total flows through line 86 to a primary, or lowest pressure, inlet 148 of compressor 145.

Though only two evaporation chambers operating above the first pressure level are shown in FIG. 2, in practice a plurality of chambers operating similar to chamber 130 may be used either before chamber 130 or between chambers 130 and 138, depending on the initial and final feed medium temperatures and on the desired temperature drop between stages. Each of the chambers operating similar to chamber 130 exhausts the vapor generated in it into the compressor at appropriately spaced out inlets of progressively higher pressure than the succeeding chamber. Only one chamber, i.e. chamber 138, exhausts its vapor into the lowest pressure inlet of the compressor, whereby the following possibilities exist: Firstly, the under-pressure of chamber 138 is above the first pressure level, so that chamber 138 is the final chamber in the operation; Secondly, the pressure of chamber 138 is equal to the first pressure, so that either the operation ends at this level or continues below the first pressure level using thermocompression to attain the first pressure level.

Steam ejectors 52 and 58 in FIG. 2 are shown connected directly to the respective vapor outlets 51 and 55 of evaporation chambers 15 and 22 by lines 149 and 150, without the optional vapor preheating arrangement of FIG. 1.

FIG. 2 also illustrates an alternative arrangement for converting the engine cooling water into high pressure steam. The auxiliary mechanical compressor 111 of FIG. 1 has been eliminated and instead the vapor from flash evaporation chamber 108 is routed through line 151 to a second intermediate inlet of compressor 145 at which the pressure is approximately equal to the evaporation pressure to be maintained in flash evaporator 108.

Another variation shown in FIG. 2 is that hot appropriately pressurized engine cooling water provides the superheat extraction medium for heat exchanger 96, flowing by way of line 153 into the heat exchanger and exiting as steam through supply line 98, as in FIG. 1. The advantage of using hot engine cooling water in place of the ambient temperature heat transfer medium of FIG. 1 is that its temperature at leaving the engine may be almost or already as high as the temperature of the ejecting steam leaving exchanger 96, so that the temperature gradient between the cooling water and the superheated steam can be maintained at a desirably low value, and so that the heat transfer within heat exchanger 96 can approach an ideal isentropic process. On the other hand, introduction of a near-ambient temperature heat transfer medium into the exchanger will create a large thermal gradient, with consequent increased entropy and reduced thermal efficiency.

On the other hand, exhaust boiler 103 can operate perfectly satisfactorily with an ambient temperature heat transfer medium in counterflow, since there is no minimum exit temperature prescribed for the exhaust gases leaving the boiler. In fact, the closer to ambient temperature that the exhaust gas is cooled, the more complete is the extraction of its otherwise waste heat.

In the embodiment of FIG. 1, all of the steam to be mechanically compressed is collected in a common steam drum before delivery into the inlet of the compressor. In this case, the compressor design is such that the section across the center-line of the compressor grows progressively smaller as the volume of the compressed steam decreases. For example, an axial flow compressor can be represented by a truncated cone in which the large end represents the inlet and the small end represents the outlet.

An important feature of the present invention results from the fact that in the alternate embodiment of FIG. 2, only part of the vapor to be mechanically compressed is delivered at the lowest steam pressure at the outlet of the ejectors. Additional vapor is generated at higher pressures and is introduced into the compressor at intermediate positions where the pressure inside the compressor is equal to the pressure of the incoming vapor. Because the addition of vapor at these intermediate points represents an increased volume to be handled by the compressor, the design of the multiple intake compressor stages includes an increased cross section at each intermediate introduction point. In this case, the compressor may be represented by a series of stacked truncated cones, as shown in the schematic diagram of FIG. 2.

As an alternative to the arrangement of FIGS. 1 and 2, it is possible to use multiple intake compression for a group of evaporators, all equipped with steam ejectors but in which the individual ejectors exhaust at different pressures. For larger plants, compressors may be provided for groups of chambers, single chambers, groups of ejectors, or even single ejectors, in parallel arrangement. Each of the compressors may have a different individually optimal intake pressure, and each may deliver steam at different output pressures or different superheat levels at the same output pressure. Furthermore, interstage cooling may be used i.e., superheat removal in the compressor either across a heat transfer surface or by means of desuperheating if the requirement for the output steam does not demand a high degree of superheat. Such interstage cooling reduces fuel consumption by the primemover.

Figure 4:
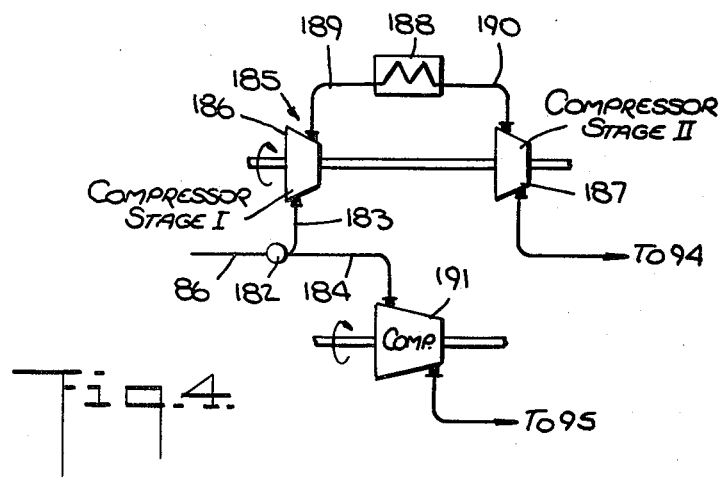
FIGS. 4 and 5 are schematic diagrams of alternative embodiments of a compressor for the vapor extracted from the aqueous feed medium.
Figure 5:
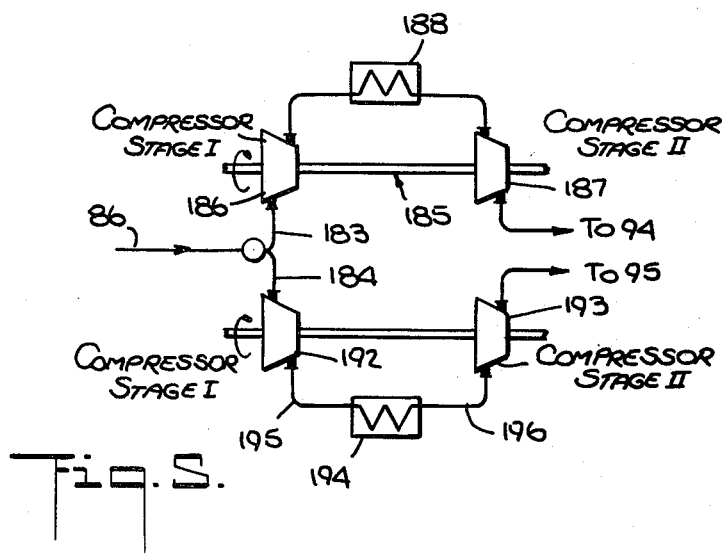

Moreover it is also possible to divide the steam at the first pressure level into first and second streams and to compress the first stream to an appropriate ejecting steam pressure with interstage cooling, so that the ejecting steam will possess a controlled limited enthalpy while the process steam output may be adiabatically compressed to a high superheat level. This alternative arrangement is shown in FIG. 4, wherein vapor from line 86 (of either system of FIG. 1 or FIG. 2) is branched at junction 182 into a first stream in line 183 and a second stream in line 184. The first stream enters a mechanical compressor 185 having at least two stages 186 and 187. Between the stages at least part of the superheat in the compressed first stream is absorbed by a fluid flowing in heat transfer relation with said first stream in a heat exchanger 188 via inlet line 189 and outlet line 190. The second stream is adiabatically compressed in a second mechanical compressor 191 to a high superheat level. Alternatively, as shown in FIG. 5, the second stream may also be compressed in two adjacent stages 192 and 193, with at least part of its superheat being absorbed between the stages in a heat exchanger 194 by a fluid entering the exchanger via line 195 and leaving via line 196.

There is, of course, no fixed upper limit for the pressure of the output steam of the first source. However, because a higher output pressure requires a larger work input and causes therefor a higher specific fuel consumption, for reasons of economy the pressure will only seldom exceed the range of 10.0–20.0 bar roughly. Being highly superheated, up to 200°–400° C. or even higher, the output steam may be used either for process heating or as working steam as it is. In some industrial processes, however, saturated steam of far higher pressure is desired. To satisfy this demand, the output steam passing through conduit 95, may enter heat exchange device 154 to give up its superheat or part of it to an appropriately pressurized stream of water of boiler quality entering in counter flow at an appropriate flow rate through supply line 155 and leaving as saturated steam of predetermined pressure by exit line 155'. (A pressurizing pump in water conduit 155 and a pressure release valve at the start of line 155' are not shown in the drawings because of limited space). The pressure attained may reach to almost the pressure corresponding to the output steam superheat temperature, i.e. eventually even reaching the steam's critical pressure, if the upper limit of the superheat temperature admits it. The water stream of boiler quality may consist of recycled final condensate of the output steam to prevent formation of scale. The partly or wholly desuperheated output steam leaves through route 95' at the same flow rate, by weight, as on entering the heat exchange device, but the steam's enthalpy is divided between the streams comprising, both together, the first source of output heat. Alternatively, by setting the release pressure high enough, instead of high pressure steam highly preheated boiler feed may be supplied if so desired.

Figure 6:
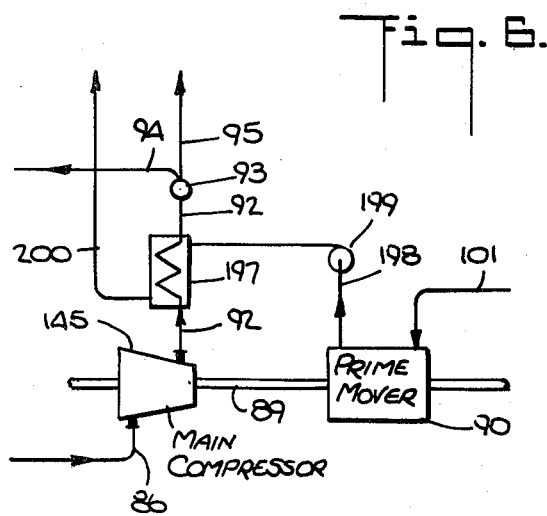
FIG. 6 is a schematic diagram of an alternative embodiment for extracting superheat from steam leaving a mechanical compressor.

In the event that the enthalpy of the steam of the first output source is reduced to the same level as the enthalpy of the ejecting steam in heat exchange device 96, the operating of both devices may be united into one, as shown in FIG. 6. In that case the combined device is best located on line 92, prior to distribution valve 93, as shown by the heat exchanger 197. As described above for heat exchanger 96, hot appropriately pressurized engine cooling water may provide the superheat extracting medium also for heat exchange device 154 and, for that matter, also for the combined device 197. In that case, the water to be transformed into steam or boiler feed enters at first through cooling water line 101 into the body cooling system of heat engine 90 to be preheated to the engine's maximal cooling temperature, eventually under pressure, prior to entering at an appropriately higher pressure into heat exchange device 154 (the route and pressurization not shown for lack of space) or into combined device 197 via line 198 through pressurizing pump 199 and leaving as output steam or liquid boiler feed via line 200. The delivery of the engine's body cooling heat either to heat exchange device 96 or to 154, or to both, reduces the flashing-off/compressing operation carried out in flash evaporation chamber 108 and auxilliary compressor 111, respectively in main compressor 88, and in certain cases may eliminate it entirely.

In the embodiments of both FIG. 1 and FIG. 2, the evaporation chambers are thermally insulated, so that all of the heat of vaporization is supplied by the aqueous feed medium. Thus, substantial cooling occurs in each evaporator, and it is possible to take advantage of this fact to transform the evaporators into artificial heat sinks for removing excess heat from the environment and from a variety of industrial process fluids that would otherwise contribute to thermal pollution of the environment. At the same time, the heat extracted contributes to the efficiency of the system by reducing fuel consumption by an appropriate amount.

Figure 3:
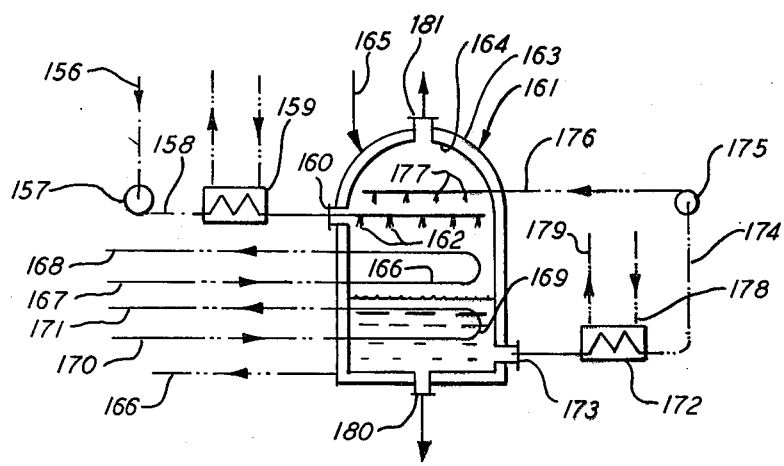
FIG. 3 is a schematic diagram of an alternate embodiment of an evaporation chamber for use in either one of the systems of FIG. 1 or 2, for gainfully combatting thermal pollution.

FIG. 3 illustrates such a heat sink. In it an alternative embodiment of an evaporating chamber is shown that is particularly advantageous for use in the first evaporative stages of a system according to the invention. As shown, an aqueous feed medium is introduced through line 156, feed pump 157, line 158, heat exchanger 159, and feed inlet 160 into double-walled evaporating chamber 161, where it is discharged in a fine spray through atomizing nozzles 162. The outer wall 163 of evaporator 161 is preferably insulated to prevent loss of heat to the outside environment, while inner wall 164 is made of a material having good heat transfer properties.

Warm water enters the space between the walls by inlet line 165 and is guided in a spiral downward path by baffles (not shown) to exit from the space at outlet 166, thereby providing a source of heat in addition to the sensible heat of the incoming feed medium for supplying the heat of vaporization for the water evaporated from the medium inside the chamber. Additional heat may be supplied from heat exchange loop 166, which may be in the form of a radiator or coil interposed in the downward path of the feed spray. A heat exchange medium of suitable temperature from any available source flows through loop 166, entering at inlet 167 and leaving from outlet 168. A similar heat exchange loop 169 may deliver still more heat to the residual feed medium at the bottom of the chamber from a heating medium circulating from inlet 170 to outlet 171.

Another optional means for absorbing heat into the evaporation process includes an additional external heat exchanger 172 connected to a feed outlet 173 of chamber 161 for rewarming the residual feed medium in the chamber and then recirculating it through line 174, pump 175, and line 176 back into the evaporator for discharge as a fine spray from a second set of atomizing nozzles 177. Heat is delivered to the recirculated feed medium in heat exchanger 172 from a suitable heating source entering the exchanger through line 178 and leaving through line 179. More than one feed recirculating loop of this type may be provided for each evaporator, if desired. Any feed medium not recirculated is discharged from another feed outlet 180, for further processing as in the systems of FIGS. 1 and 2, while the vapor is evacuated through outlet 181.

Suitable sources of heat for the various heat exchangers associated with the evaporator of FIG. 3 include thermally polluted water bodies, condensing water, solar heated water or air, industrial effluents, flue gases, cooling air from air conditioners, air rejected from compressors, and process fluids that require cooling without evaporation, such as beer and milk after pasteurization.

The evaporation chamber embodiment of FIG. 3 is particularly suited for the first evaporator stages in multistage evaporation systems, because ejecting steam consumption (and corresponding fuel consumption) rises with each succeeding stage as a result of the progressively lower under-pressures required to be maintained in the chambers. Thus, it is most desirable to use a double-walled evaporator according to FIG. 3 as the first stage evaporator of a system, less desirable to use one as the second stage, and so on. It will, of course, not be economical to use double-walled evaporators for more than the first half of the stages in a multi-stage evaporation plant.

The heat introduced in addition to the sensible heat content of the incoming aqueous feed medium increases the vaporization rate in the first double-walled stage, or stages, where specific ejecting steam consumption is lower but leaves unchanged the vaporization rate in the later stages, where specific ejecting steam consumption is higher, thereby reducing the average steam consumption over all the stages. Of course, it is necessary to match the heat source to the evaporation stage, so that relatively low temperature sources are used for later stages than the higher temperature sources, to insure that the temperature of the heat source is appropriately higher than the temperature of the stage.

The foregoing description of the preferred embodiments provides a basic understanding of the invention so that the parameters can now be discussed which lead to an optimal level for the first steam pressure at the exit of the ejectors, which level is identical to the intake pressure into mechanical compression and also represents the level at which the process employing feedwater of the warm/hot feed source changes over from mechanical compression solely to thermo-compression as a first step prior to final mechanical compression.

As previously indicated, the low under-pressures prevailing in the evaporation chambers belonging to the first feed source cause the vapor to be extremely voluminous. The vapor's specific volume grows rapidly in an inverse ratio to the falling under-pressure gradient, starting with 28.2 m$^3$/kg at a tepid 32° C. and corresponding 0.05 bar, and reaching 206 m$^3$/kg at 0° C. and corresponding 0.006 bar. Furthermore, the low under-pressure result in a very high compression ratio to be overcome to reach the second steam pressure. Assuming the relatively low level of 2 bar for the second pressure, the respective compression ratios amount then to 2/0.05=40 and to 2/0.006=328.

Hence, a mechanical compressor starting directly at the lowest under-pressure in the range below about 0.05 bar would have to be of enormous size, eventually too expensive to build, to maintain, and to operate, and it would not be sound, technologically and economically, to try to handle the vapor throughout the whole compression range by mechanical means solely. There exists thus a dilemma: theoretically it takes less energy to reach the second steam pressure by purely mechanical compression than by combined thermo-compression and mechanical compression, but practically it is almost impossible, if not uneconomical, to prevail over the vapor in the low pressure range of approximately less than 0.05 bar, by way of mechanical compression solely.

Thermo-compression, on the other hand, is able to handle the voluminous vapor quite efficiently, but only up to a certain point. As can be learned from nomograms or formulas for the deducing or compiling of ejecting steam consumption appearing in relevant literature of vacuum cooling by steam ejection, ejecting steam consumption is not unreasonable even for very low underpressures as long as a low compression ratio between the first steam pressure and the under-pressure is maintained. However, steam consumption rises exponentially with increasing first steam pressure, implying that there is a point before the rise becomes too steep up to which thermo-compression can be applied reasonably. Beyond that point ejecting steam consumption gets soon out of reach, so much so that, if the first steam pressure equals the second steam pressure, consumption would be infinite, even in an ideal loss-free process.

To overcome the limitations inherent in both methods of compression, one solution would be to employ each one in the range where it is most efficient and the other one least so. However, the present invention's method goes a significant step farther. It combines both methods, by means of the cycled manner of ejecting steam regeneration by the mechanical compressor, into one compact operation, more compact than any one of the methods of compression alone, not to mention the sum of both, since regarding the mechanical plant of the novel process, there is not only no boiler in operation, but the employed compressor—despite the fact that it recompresses the ejecting steam as well as it compresses the ejected steam—is substantially more compact than in direct mechanical compression starting at the lowest under-pressure.

In conventional direct mechanical compression of low pressure vapor into higher pressured steam the compactness of the compressor is a function of two parameters: the specific intake volume of the vapor in $m^3/kg$ and the compression ratio of the compressor. Designating the first parameter by A and the second parameter by B, a compactness factor may be defined as the product of $A \times B$.

This compactness factor is to be regarded strictly as a tool for the purpose of comparison, to present the relative compactness solely, and since it carries no unit denomination it does not indicate any actual size but only a comparative one.

In the hybrid process of the present invention which combines thermo-compression with mechanical compression, a third parameter must be introduced to take account of the requirement that for each 1 kg of newly compressed steam (i.e. formerly evacuated vapor), the compressor must also recompress the amount of ejecting steam used to generate the new steam. Designating the third parameter by C, a compactness factor for the hybrid system of the present invention can be defined as $A \times B \times C$, wherein B now actually represents the compression ratio of second steam pressure per first steam pressure only, since the remaining ratio (first steam pressure per base under-pressure) is already accounted for in C in the form of ejecting steam used to attain the first pressure, and wherein A is the specific intake volume at the first pressure. The value of C in direct mechanical compression is, of course, always 1 kg.

Referring to the example given above (specific vapor volume at 0° C. and 0.006 bar = 206 $m^3/kg$, ejecting steam pressure at the second steam pressure = 2 bar) the compactness factor $A \times B$ in direct mechanical compression is $206 \times (2/0.006) = 67,570$, whereas for combined compression operating over the same temperature range a near optimal value was found for the compactness factor at 0.1 bar approximately, where A = 14.5 $m^3/kg$, B = 20 times and C = 4.5 + 1 kg = 5.5 kg, resulting in a factor $A \times B \times C$ of 1595 only. This makes, for the given example solely, the present invention's compressor operating in combined compression fashion, 67570/1595 = 42.4 times more compact than a compressor operating in direct compression starting at 0.006 bar. For the value C, four-stage evaporation starting at an ambient 24° C. and a vapor preheating effect of 2 kcal/kg was assumed. Regarding only the mechanical compression ratio B, it is 328/20 = 16.4 times smaller in combined compression.

The lowest value for the compactness factor, for any given ejecting steam pressure and lowest chamber pressure, can be compiled using data from steam tables or Mollier diagrams for water steam and from nomograms or formulas for the computation of ejecting steam consumption, by means of interpolating its three interrelated parameters A, B and C, relevant for successive levels of the first pressure, covering the broader range of approximately 0.04–0.2 bar. At both sides of the lowest value, i.e. at a higher first pressure and also at a lower, larger compactness factors are obtained: in the downward direction C falls but $A \times B$ rises in a higher proportion; in the upward direction $A \times B$ falls but C rises in a relatively steeper manner.

The picture emerging from the compilation of said data shows the lowest values for the compactness factor to be in the pressure band of approximately 0.05–0.15 bar, wherein the lower pressures relate to lower ejecting steam pressures (starting at about 0.5 bar), and the higher pressures in the band pertain to higher ejecting steam pressures (up to 20 bars).

The comparative compactness factor indicates only that first steam pressure level wherein the mechanical equipment is at its most compact incorporation for any given ejecting steam pressure, but it does not represent the most efficient configuration of the process to generate the highest possible energy-output/fuel-input ratio.

At higher first steam pressures than indicated by the compactness factor, the output/input ratio decreases rapidly because of exponentially growing ejecting steam consumption, so that the advantage of the present invention's process to generate a substantial excess of output over input is diminished swiftly and so that it is not advisable to fix the first pressure in that range.

At lower first steam pressures, however, the output/input ratio increases because of falling ejecting steam requirements. But not apparent in the calculation of the out/in ratio, the size of the mechanical equipment increases too, causing thus higher yearly capital and operating costs. However, the equipment's increase in size progresses at first in a not too steep ascent until at below about 0.05 bar it accelerates rapidly. The compactness factor indicates thus a ceiling level for the first steam pressure, below which in the range down to about 0.05 bar, prevailing economic conditions, such as costs and availability of fuel, on the one hand, and capital, on the other hand, can be balanced to achieve the lowest, or most opportune, break-even point.

Although specific embodiments have been illustrated and described, it will be readily apparent to those skilled in the art that various modifications may be made without departing from the spirit of the invention as disclosed and claimed.

I claim:

1. A process of continuously generating heat energy, cooling capacity and pure water from an available aqeuous feed medium, the process comprising:

introducing a continuous flow of an aqueous liquid feed medium from a source at an initial temperature into at least one enclosed region maintained at an under-pressure below the boiling pressure of said medium at the initial temperature;

evaporating part of the water in the aqueous feed medium inside the region by extracting at least a part of the heat of vaporization from the remainder of the aqueous medium;

withdrawing water vapor evaporated from the feed medium in the region;

compressing the withdrawn vapor to a predetermined output pressure;

delivering at least part of said compressed withdrawn vapor as a first source of output heat energy and as a source of pure output water; and discharging continuously the cooled remainder of the aqueous feed medium from the region as a source of cooling capacity, wherein the improvement comprises:

the step of withdrawing water vapor from the region comprises supplying a jet of ejecting steam for evacuating water vapor evaporated from the feed medium in the region into a combined flow with said jet of ejecting steam; and the step of compressing the withdrawn vapor comprises thermo-compressing the vapor by means of the ejecting steam jet in a converging-diverging throat to a first pressure, intermediate between the pressure maintained in the region and the final output pressure, and then mechanically compressing the combined thermo-compressed vapor and ejecting steam from the first pressure to the output pressure.

2. A process according to claim 1 wherein all of the heat of vaporization of said evaporated part of the feed medium is extracted from the remainder of the feed medium.

3. A process according to claim 1, the process further comprising:

dividing the total of said mechanically compressed combined flow into a first stream and a second stream;

recycling the first stream to serve as said jet of ejecting steam; and delivering the second stream as said first source of output heat.

4. A process according to claim 1 wherein said first pressure is in the range of approximately 0.04 bar to approximately 0.2 bar.

5. A process according to claim 1 wherein said first pressure is in the range of approximately 0.05 bar to approximately 0.15 bar.

6. A process according to claim 1 wherein said enclosed region is one of a plurality of enclosed regions arranged in series from a first region to a final region, each region being maintained at an under-pressure lower than the under-pressure in the preceding region, the process further comprising:

flowing into each enclosed region the cooled remainder of the feed medium from the preceding enclosed region;

withdrawing water vapor evaporated from the feed medium in each region;

combining at least part of said withdrawn vapor from each region to serve as said first source of output heat;

compressing the withdrawn water vapor from each region to said output pressure; and discharging the cooled remainder of the aqueous feed medium from the final enclosed region.

7. A process according to claim 6 wherein said one enclosed region is subsequent to the first of the plurality of enclosed regions, and the step of compressing the withdrawn vapor from the first of the plurality of regions consists of mechanically compressing the vapor from the respective underpressure maintained in the first region to said output pressure.

8. A process according to claim 7 wherein said one region is the final enclosed region, the process further comprising:

dividing the total of said combined compressed withdrawn vapor from at least the first region and said final region into a first stream and a second stream and recycling the first stream to serve as the ejecting steam for at least the final region, the second stream thereby serving as said first source of output heat.

9. A process according to claim 6 wherein the underpressure in each of the plurality of enclosed regions is maintained by supplying a respective jet of ejecting steam to evacuate the water vapor generated from the feed medium in each region into a combined flow with the respective jet of ejecting steam, and the step of compressing the vapor withdrawn from each region comprises thermo-compressing the vapor by means of the respective jet of ejecting steam in a converging-diverging throat to a respective pressure intermediate between the underpressure maintained in the corresponding region and the predetermined output pressure and then mechanically compressing the combined flow from each region from the respective intermediate pressure to said predetermined output pressure, the process further comprising:

dividing the total of said compressed combined flows of withdrawn vapor and ejecting steam from each region into a first stream and a second stream and recycling the first stream to serve as the respective jets of ejecting steam for each region, the second stream thereby serving as said first source of output heat.

10. A process according to claim 9 wherein the respective intermediate pressure of the thermo-compressed combined flow of withdrawn vapor and ejecting steam from each enclosed region is equal to said first pressure.

11. A process according to claim 10 comprising:

collecting the total of the thermo-compressed flows of ejecting steam and withdrawn vapor from each enclosed region into a common region at said first pressure, and the steps of mechanically compressing each of the flows comprise mechanically compressing the combined total of the flows collected in the common region from said first pressure to said second pressure.

12. A process according to claim 1 or 6 comprising: delivering the discharged cooled remainder of the aqueous feed medium as a source of output cooling capacity from the process.

13. A process according to claim 1 or 6 wherein the temperature of the cooled remainder is in the refrigeration range, the process comprising:
   delivering the discharged cooled remainder of the aqueous feed medium as a source of output refrigeration capacity from the process.

14. A process according to claim 13 wherein the aqueous feed medium contains an antifreeze agent, and the temperature of the cooled remainder is below 0° C.

15. A process according to claim 1 or 6 comprising:
   flowing the cooled remainder of the aqueous feed medium as a source of output cooling in heat transfer relation with a substance to be cooled, for absorbing heat from said substance,
   and
   recycling the rewarmed remainder of the aqueous feed medium to the first-mentioned enclosed region.

16. A process according to claim 15 comprising:
   flowing the remainder of the aqueous feed medium, after absorbing heat from said substance, in heat transfer relation with a thermal reservoir having a temperature equal to the temperature of the initial flow of aqueous flow medium into the first-mentioned region before recycling said remainder to the feed inlet of the first region.

17. A process according to claim 16 wherein said thermal reservoir comprises said source of an aqueous feed medium at said initial temperature.

18. A process according to claim 1 or 8 comprising preheating the vapor evacuated by means of the jet of ejecting steam prior to its thermo-compression in the respective converging-diverging throat.

19. A process according to claim 18 wherein the vapor is preheated after its passage from the corresponding enclosed region and before its mixing with the respective ejecting steam jet.

20. A process according to claim 3 or 8 comprising:
   flowing a fluid in heat absorbing relation with said first stream prior to recycling said stream to serve as ejecting steam at a predetermined flow rate for extraction of a predetermined amount of superheat from said first stream; and
   delivering the heated fluid as a second source of output heat from the process.

21. A process according to claim 20 wherein said fluid is an aqueous heat extracting liquid at a high pressure up to that of the saturation pressure corresponding to the superheat temperature of said first stream, and said predetermined amount of superheat extracted from said first stream by the aqueous liquid at said predetermined flow rate converts the aqueous heat extracting liquid to steam at said high pressure.

22. A process according to claim 20 wherein said fluid is water of boiler feed quality at a high pressure up to that of the saturation pressure corresponding to the superheat temperature of said first stream, and said predetermined amount of superheat preheats the water for delivery as high pressure boiler feed.

23. A process according to claim 21 wherein said high pressure is in a range up to the critical pressure of steam.

24. A process according to claim 3 or 8 comprising:
   flowing a fluid in heat absorbing relation with said second stream at a predetermined flow rate for extraction of a predetermined amount of superheat from said second stream.

25. A process according to claim 24 wherein said fluid is an aqueous heat extracting liquid at a high pressure up to that of the saturation pressure corresponding to the superheat temperature of said second stream, and said predetermined amount of superheat extracted from said second stream by the aqueous liquid at said predetermined flow rate converts the aqueous liquid to steam at said high pressure.

26. A process according to claim 24 wherein said fluid is water of boiler feed quality at a high pressure up to that of the saturation pressure corresponding to the superheat temperature of said second stream, and said predetermined amount of superheat preheats the water for delivery as high pressure boiler feed.

27. A process according to claim 1 or 6 comprising:
   flowing a fluid in heat transfer relation with said compressed vapor at a predetermined flow rate for extraction of a predetermined amount of superheat from the vapor.

28. A process according to claim 27 wherein said fluid is an aqueous heat extracting liquid at a high pressure up to that of the saturation pressure corresponding to the superheat temperature of said first stream, and said predetermined amount of heat extracted from said vapor by the aqueous liquid at said predetermined flow rate converts the aqueous liquid to steam at said high pressure.

29. A process according to claim 27 wherein said fluid is water of boiler feed quality at a high pressure up to that of the saturation pressure corresponding to the superheat temperature of said vapor, and said predetermined amount of superheat preheats the water for delivery as high pressure boiler feed.

30. A process according to claim 29 wherein said high pressure is in a range up to the critical pressure of steam.

31. A process according to claim 3 or 8 comprising:
   flowing an aqueous heat extracting liquid, at a high pressure up to that of the saturation pressure corresponding to the superheat temperature of said mechanically compressed steam at the predetermined output pressure, in heat absorbing relation with the total flow of said mechanically compressed vapor and ejecting steam prior to the step of dividing said total flow at a predetermined flow rate for extraction of a predetermined amount of superheat from said total flow.

32. A process according to claim 31 wherein said predetermined amount of superheat extracted from the total flow of compressed vapor and ejecting steam by the aqueous liquid at said predetermined flow rate converts the aqueous heat extracting liquid to steam at said high pressure.

33. A process according to claim 31 wherein said fluid is water of boiler feed quality at a high pressure up to that of the saturation pressure corresponding to the superheat temperature of said vapor, and said predetermined amount of superheat preheats the water for delivery as high pressure boiler feed.

34. A process according to claim 1 or 6 wherein said aqueous feed medium comprises impure, non-sterile water and said withdrawn vapor serves as an eventual source of purified sterile water.

35. A process according to claim 1 or 6 comprising flowing a fluid containing waste heat warmer than the aqueous feed medium in heat transfer relation with the aqueous feed medium in said enclosed region for delivering heat to the aqueous medium in said region, which serves as an environmental heat sink to combat thermal pollution.

36. A process according to claim 35 wherein the at least one said enclosed region is only the first one of a series of said enclosed regions.

37. A process according to claim 35 wherein the at least one said enclosed region is no more than the first half of a series of said enclosed regions.

38. A process according to claim 3 or 8 wherein the step of dividing the total of said combined flow into a first stream and a second stream occurs before the step of mechanical compression, and said latter step comprises mechanically compressing the first stream in at least two stages.

39. A process according to claim 38 comprising flowing a fluid in heat transfer relation with said first stream between at least two adjacent stages of mechanical compression for absorbing at least a part of the superheat in said first stream.

40. A process according to claim 3 or 8 wherein the step of dividing the total of said combined flow into a first stream and a second stream occurs before the step of mechanical compression, and said latter step comprises mechanically compressing the second stream in at least two stages.

41. A process according to claim 40 comprising flowing a fluid in heat transfer relation with said second stream between at least two adjacent stages of mechanical compression for absorbing at least a part of the superheat in said second stream.

42. A process according to claim 8 wherein said step of mechanical compression comprises mechanically compressing in a plurality of stages and introducing part of said vapor withdrawn from the first enclosed region into a higher pressure compression stage than the combined ejecting steam and evacuated vapor from the final enclosed region.

43. A process according to claim 1 or 6 wherein said aqueous feed medium is a solution, and the process further comprises recycling the discharged remainder of said medium for concentrating said solution.

44. A process according to claim 1 or 6 wherein said aqueous feed medium is a suspension, and the process further comprises recycling the discharged remainder of said medium for concentrating said suspension.

45. A process according to claim 1 or 6 wherein said aqueous feed medium is an emulsion, and the process further comprises recycling the discharged remainder of said medium for concentrating said emulsion.

46. A process according to claim 1 or 6 wherein said aqueous feed medium is an effluent and the process further comprises recycling the discharged remainder of said medium for concentrating said effluent to a slurry as a preparatory step to recover ingredients contained in the effluent.

47. A process according to claim 1 or 8 wherein said step of mechanical compression comprises:
providing mechanical energy from a fuel energized heat engine;
rejecting heat from said heat engine to exhaust gases;
rejecting heat from said heat engine to a pressurized water cooling system;
recovering useful heat from said exhaust gases in counter-flow at maximal output temperatures, as a third source of output heat; and
recovering useful heat from said pressurized water cooling system at maximal temperatures compatible with proper engine cooling as a fourth source of output heat.

48. A process according to claim 41 wherein the step of recovering useful heat from said water cooling system comprises:
flowing heated cooling water from the pressurized cooling system of the engine into an enclosed flash evaporation region maintained at a pressure below the saturation pressure of the heated cooling water;
evaporating part of the cooling water inside the flash evaporation region by transfer of the heat of vaporization from the remainder of the cooling water in the flash evaporation region;
mechanically compressing the evaporated part of the cooling water to a pressure and temperature suitable for industrial use;
recycling the cooled remainder of the cooling water back to the engine for further absorption of engine reject heat; and
replenishing the evaporated quantity of cooling water.

49. A process according to claim 47 wherein the step of recovering useful heat from said pressurized water cooling system comprises:
flowing pressurized heated cooling water from the engine in heat transfer relation to said first stream for absorbing superheat from said stream before it is recycled to serve again as ejecting steam and
delivering the further heated cooling water as a second source of output heat from the process.

50. A process according to claim 47 wherein the step of recovering useful heat from said pressurized water cooling system comprises:
flowing pressurized heated cooling water from the engine in heat transfer relation to the vapor evacuated by means of the respective jet of ejecting steam prior to its thermocompression in the respective converging-diverging throat.

51. A process according to claim 41 wherein the step of recovering useful heat from said pressurized water cooling system comprises:
flowing pressurized heated cooling water from the engine in heat transfer relation to said second stream for absorbing superheat from said stream and delivering the further heated cooling water as part of the first source of output heat from the process.

52. A process according to claim 47 wherein the step of recovering useful heat from said pressurized water cooling system comprises:
flowing pressurized heated cooling water from the engine in heat transfer relation to the total flow of compressed vapor and ejecting steam prior to said dividing step
and
delivering the further heated cooling water as a source of output heat from the process.

53. A process according to claim 47 wherein the step of recovering useful heat from said exhaust gases comprises:
flowing a heat transfer medium in heat transfer relation to said exhaust gases for absorbing a substantial part of the above-ambient heat content of said gases.

54. A process according to claim 53 wherein the heat transfer medium is water and wherein said water is converted into steam by the heat absorbed from said exhaust gases.

55. A process according to claim 47 comprising preheating the vapor evacuated by means of the respective jets of ejecting steam prior to its thermo-compression in the respective converging-diverging throats by flowing hot lubricating oil from the engine in heat transfer relation with said vapor.

* * * * *

UNITED STATES PATENT AND TRADEMARK OFFICE
CERTIFICATE OF CORRECTION

PATENT NO. : 4,282,070
DATED : 4 August 1981
INVENTOR(S) : Dan Egosi

It is certified that error appears in the above—identified patent and that said Letters Patent is hereby corrected as shown below:

Column 5, line 17: change "relativey" to --relatively--.

Column 18, lines 56-57: after "the low". "under-pressure" should read --under-pressures Column 26, line 45: after "claim" change "41" to --47--.

Signed and Sealed this

Seventeenth Day of November 1981

[SEAL]

Attest:

GERALD J. MOSSINGHOFF

Attesting Officer    Commissioner of Patents and Trademarks